United States Patent [19]

Beckle et al.

[11] Patent Number: 5,153,909
[45] Date of Patent: Oct. 6, 1992

[54] RESOURCE CONTROL AND DATA HANDLING FOR CENTRAL OFFICE BASED AUTOMATIC CALL DISTRIBUTORS

[75] Inventors: LeAnn M. Beckle, Aurora, Ill.; Gary B. Crockett, Richardson, Tex.; Kevin D. Easley, Naperville, Ill.

[73] Assignee: AT&T Bell Laboratories, Murray Hill, N.J.

[21] Appl. No.: 357,135

[22] Filed: May 25, 1989

[51] Int. Cl.⁵ .............................................. H04M 3/54
[52] U.S. Cl. ................................... 379/265; 379/266
[58] Field of Search ... 364/200 MS File, 900 MS File; 379/201 MS File, 95 MS File, 112 MS File, 265, 266, 207, 269, 202, 204, 205

[56] References Cited

U.S. PATENT DOCUMENTS

| | | | |
|---|---|---|---|
| 4,232,199 | 11/1980 | Boatwright et al. | 379/205 |
| 4,432,057 | 2/1984 | Daniell et al. | 395/600 |
| 4,439,830 | 3/1984 | Chueh | 395/600 |
| 4,510,351 | 4/1985 | Costello et al. | 179/27 |
| 4,588,991 | 5/1986 | Atalla | 340/825.31 |
| 4,656,623 | 4/1987 | Dalby, Jr. et al. | 370/60 |
| 4,694,483 | 9/1987 | Cheung | 379/34 |
| 4,797,877 | 1/1989 | Pope et al. | 379/204 |
| 4,799,153 | 1/1989 | Hann et al. | 364/200 |
| 4,866,763 | 9/1989 | Cooper et al. | 379/221 |
| 4,876,711 | 10/1989 | Curtin | 379/203 |
| 4,885,789 | 12/1989 | Burger et al. | 380/25 |
| 4,893,325 | 1/1990 | Pankonen et al. | 379/45 |
| 4,975,902 | 12/1990 | Damany | 379/202 |
| 5,062,103 | 10/1991 | Davidson et al. | 379/265 |

OTHER PUBLICATIONS

AT&T Technical Journal, vol. 64, No. 6, Jul.-Aug. 1985, 1303-1564, 5ESS Switch.
"AT&T 5ESS® Switch Automatic Call Distributor Management Information Systems", Jun. 1988.
"CO-Based ACD Services: Strategic Implications", Research Newsletter, Mar. 1989.

Primary Examiner—Gareth D. Shaw
Assistant Examiner—Dennis M. Butler
Attorney, Agent, or Firm—Werner Ulrich

[57] ABSTRACT

This invention relates to a central office (CO) based automatic call distributor (ACD) system arrangement for providing resource control and call event data processing services for a plurality of ACD systems, served by a switching system. The arrangement comprises a switching system, having a control processor complex (CPC), a special Event and Control Link (ECL) processor that performs ACD end-user call event data partitioning and ACD end-user resource allocation message screening, and one or more Management Information System (MIS) processors that perform data processing to derive statistics associated with calls to an ACD. The ECL receives, partitions, and transmits call event data messages from the CPC to the MIS processors. The ECL also screens resource allocation request messages, sent by ACD end-users to control the allocation of ACD resources, by checking that the messages match a predetermined format, and by verifying that the end-user making the request has permission to make the requested resource allocation changes. Finally, the ECL interfaces with multiple MIS processors. These MIS processors can be located at the CO, the premises of an enhanced service provider, or on an end-user's premises. Advantageously, end-user call event data partitioning and resource allocation message screening is performed by the ECL without increasing the complexity of the CPC program, and an ACD end-user has a choice of options of using his own MIS processor, sharing an MIS processor provided by an enhanced service provider, or sharing an MIS processor provided in the switching system.

2 Claims, 10 Drawing Sheets

FIG. 4
"AGENT LOGGED IN" EVENT MESSAGE

| TYPE FIELD (10100) | POSITION NUMBER (10200) | AGENT ID NUMBER (10300) |
|---|---|---|
| "L" | 1234 | 0001 |

(10000)

FIG. 5
AGENT ID TABLE (11000)

| ID (11101) | MODIFY (11102) | CUSTOMER (11103) | POSITION (11104) |
|---|---|---|---|
| XXXX | XXXXXX | XXXX | XXXX |
| 0001 | 051889 | 2345 | 1234 |
| XXXX | XXXXXX | XXXX | XXXX |
| . | . | . | . |
| . | . | . | . |
| . | . | . | . |

(11100)

FIG. 6
ORIGINATOR'S "HEARTBEAT/KEEP ALIVE" MESSAGE

| TYPE FIELD | LOOP FLAG |
|---|---|
| "K" | 0 |

(14000)
(14100)

FIG. 7
RECEIVER'S "HEARTBEAT/KEEP ALIVE" MESSAGE

| TYPE FIELD | LOOP FLAG |
|---|---|
| "K" | 1 |

(15000)
(15100)

FIG. 11
"CHANGE SERVING TEAM QUEUE"
RESOURCE ALLOCATION MESSAGE

16000

| HEADER (16100) | VIEW ID NUMBER (16200) | KEY ATTRIBUTE (16300) | ATTRIBUTE (16400) | COMMAND (16500) | NEW VALUE (16600) |
|---|---|---|---|---|---|
| 1234 | 21V2 | 47 | 2 | CHG | 26 |
| REQUESTING MIS PROCESSOR ID NUMBER | | TEAM NUMBER | QUEUE NUMBER | | NEW QUEUE NUMBER |

FIG. 12
SERVING TEAM TABLE

17000

| TEAM NUMBER (17100) | MODIFY (17200) | CUSTOMER (17300) | TRANSFER (17400) |
|---|---|---|---|
| 47 | 020789 | 1234 | Y |
| . | . | . | . |
| . | . | . | . |
| . | . | . | . |

FIG. 13
CALL QUEUE TABLE

18000

| QUEUE NUMBER (18100) | MODIFY (18200) | CUSTOMER (18300) | MAX (18400) |
|---|---|---|---|
| 2 | 032589 | 1234 | 236 |
| . | . | . | . |
| . | . | . | . |
| . | . | . | . |

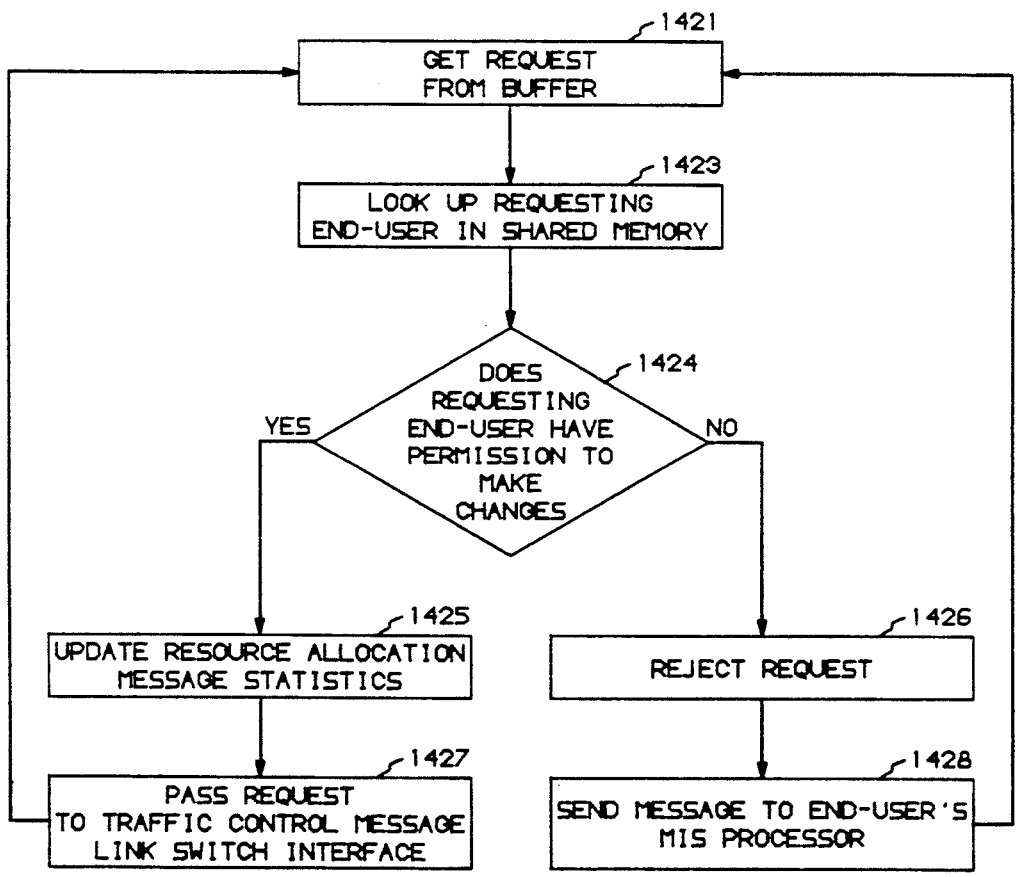

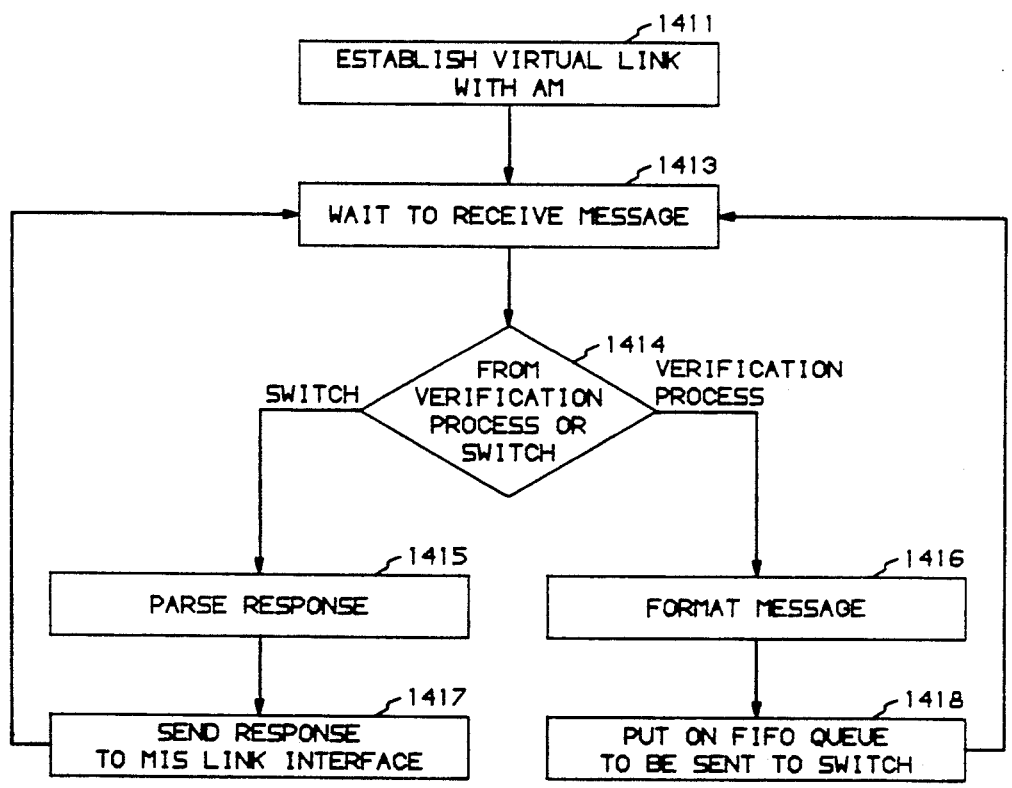

RESOURCE CONTROL AND DATA HANDLING FOR CENTRAL OFFICE BASED AUTOMATIC CALL DISTRIBUTORS

TECHNICAL FIELD

This invention relates to automatic call distributor system architecture.

PROBLEM

Automatic call distributor (ACD) systems are widely used by businesses (end-users) engaged in activities such as telemarketing and airline reservations. ACD agents ordinarily receive calls for service at agent positions. Such systems perform call handling and queuing, and process call event data to derive service statistics. An example of such statistics is the number of calls to each agent per hour.

The art today allows ACD systems to be subsystems of a central telephone office (CO) switching system, and to be controlled by a CO control processor or control processor complex (CPC). Connections of incoming calls to or outgoing calls from the agent positions are established in the switching system. In such configurations, management information system (MIS) data processors typically perform data processing and statistical analysis. For example, such data processing involves the calculation of the average time a call waits in a queue before service. The switch control processor generally is arranged to partition ACD end-user data and send the data for each end-user to an MIS processor at the premises of each end-user for processing the data. In the other direction, from the MIS processors to the switching system, data messages from ACD end-users are used by CO based ACD systems to adjust the allocation of ACD resources, such as the assignment of different agents to serve different types of calls, controlling call queue length, and controlling queue overflow treatment.

One problem associated with such architectures is that these systems limit data processing to individual, per ACD, MIS processors, located for convenience at the end-users' premises. This arrangement works well for end-users who prefer the advantages of having their data processed at their own premises under their control. Other end-users, however, prefer to share the MIS processor expense, and to be shielded from processing problems, by having their data processed by a telephone administration at the CO. Still other end-users want their data processing customized in a manner not offered at the CO while sharing the expense of an MIS processor, and, therefore, prefer to use enhanced service providers. However, if MIS processors were to be shared, messages for controlling the allocation of ACD resources would have to be screened to prevent unauthorized access of end-user data, and to prevent unauthorized resource reallocation, or redirecting a competitor's calls. Such screening would undesirably add substantial complexity to an already complex control program. Shared use of MIS processors is therefore not available in the art today.

Therefore, a recognized problem in the art is that there are no satisfactory arrangements for CO based ACD systems to permit end-users to share MIS processors.

SOLUTION

The aforementioned problem is solved and a technical advance is made in the art by providing a CO based ACD architecture comprising an ACD switching system, i.e., a central office including a control processor means such as a control processor complex (CPC), one or more MIS processor(s), and a special processor, interposed between the ACD switching system the MIS processor(s). The special processor provides ACD end-user call event data processing services and end-user resource allocation control. Providing data processing services comprises recognizing, partitioning, and transmitting call event data. Providing resource control comprises screening data messages for the allocation of resources, to protect end-user resources, before transmitting such messages to the CPC. Advantageously, the use of the special processor makes it possible for end-users to choose between having their data processing performed by a telephone company at the CO, by an enhanced service provider, or by their own MIS processor.

An exemplary embodiment of the invention comprises a CPC, a special Event and Control Link Processor (ECL) that provides end-user call event data processing services and end-user resource control, and one or more MIS processors. These MIS processors can be located at the CO, the premises of an enhanced service provider, or on an end-user's premises. The ECL receives, partitions, and transmits call event messages from the CPC to one of the MIS processors, and screens resource control messages from the MIS processors prior to transmitting them to the CPC. The ECL interfaces with the CPC to control message exchanges by first establishing a virtual link between the ECL and the CPC, and periodically executing a handshaking protocol to ensure that the virtual link is still operative.

The ECL parses a call event data message and uses identification data in the message to determine the MIS processor that is to receive the message. The identification data is an ACD agent position number, an ACD agent ID, or some other resource that has been assigned to an end-user. The data is used as a key for a table lookup in the ECL memory to determine the recipient MIS processor. The call event data message is packetized with the address of the recipient MIS processor, and transmitted to that processor for use by an end-user. The message is sent using an interface arrangement between the ECL and the recipient MIS processor, which establishes a virtual link therebetween, and periodically executes a handshaking protocol over that links for ensuring that the link is still operational. Advantageously, end-user call event data partitioning is provided by the ECL without increasing the use of resources of the CPC.

In accordance with one aspect of the invention, resource allocation messages are generated by end-users employing their MIS processor or supervisor work stations connected to an MIS processor to request access to resource control data at the switching system. The ECL, upon receiving those messages, screens them to ensure that each request made by an end-user attempts to access only that end-user's own information and resources. Valid access requests are forwarded to the CPC by an interface process, while invalid requests are rejected and an error message is sent to the requesting end-user MIS processor or supervisor work station.

The screening of resource allocation messages provides protection and privacy of each ACD end-user's data and resources. The screening comprises two steps: (1) the ECL checks that messages match a predetermined message format, and (2) the ECL verifies that end-users making requests have permission to make the requested resource allocation changes. It performs these functions by analyzing information from a tables in the ECL memory.

Accordingly, this invention relates to ACD MIS processor arrangements for CO based ACD systems. An ECL acts as an interface between a plurality of ACD subsystems, served by a switching system, and a plurality of MIS processors assigned to ACD end-users, enhanced service providers or CO's. The ECL receives, partitions and transmits call event data messages from the switching system to the end-user's assigned MIS processor. The ECL also screens resource allocation messages from end-users. Advantageously, end-users are offered a choice of having an MIS processor at their premises, using a CO-based MIS processor perform their data processing, or using an enhanced service provider to perform their data processing. Advantageously, switch performance is enhanced by removing the partitioning and screening functions from the switch CPC to the ECL.

BRIEF DESCRIPTION OF THE DRAWING

FIGS. 3, 8-10 and 14-15 are flow diagrams illustrating the operation of various processes within the ECL system;

FIGS. 4 and 5 illustrate an event message and the database tables used to process the message;

FIGS. 6 and 7 depict a protocol message used by the system; and

FIGS. 11, 12 and 13 show a resource allocation message and the database tables used to process the message.

DETAILED DESCRIPTION

Figure 1:
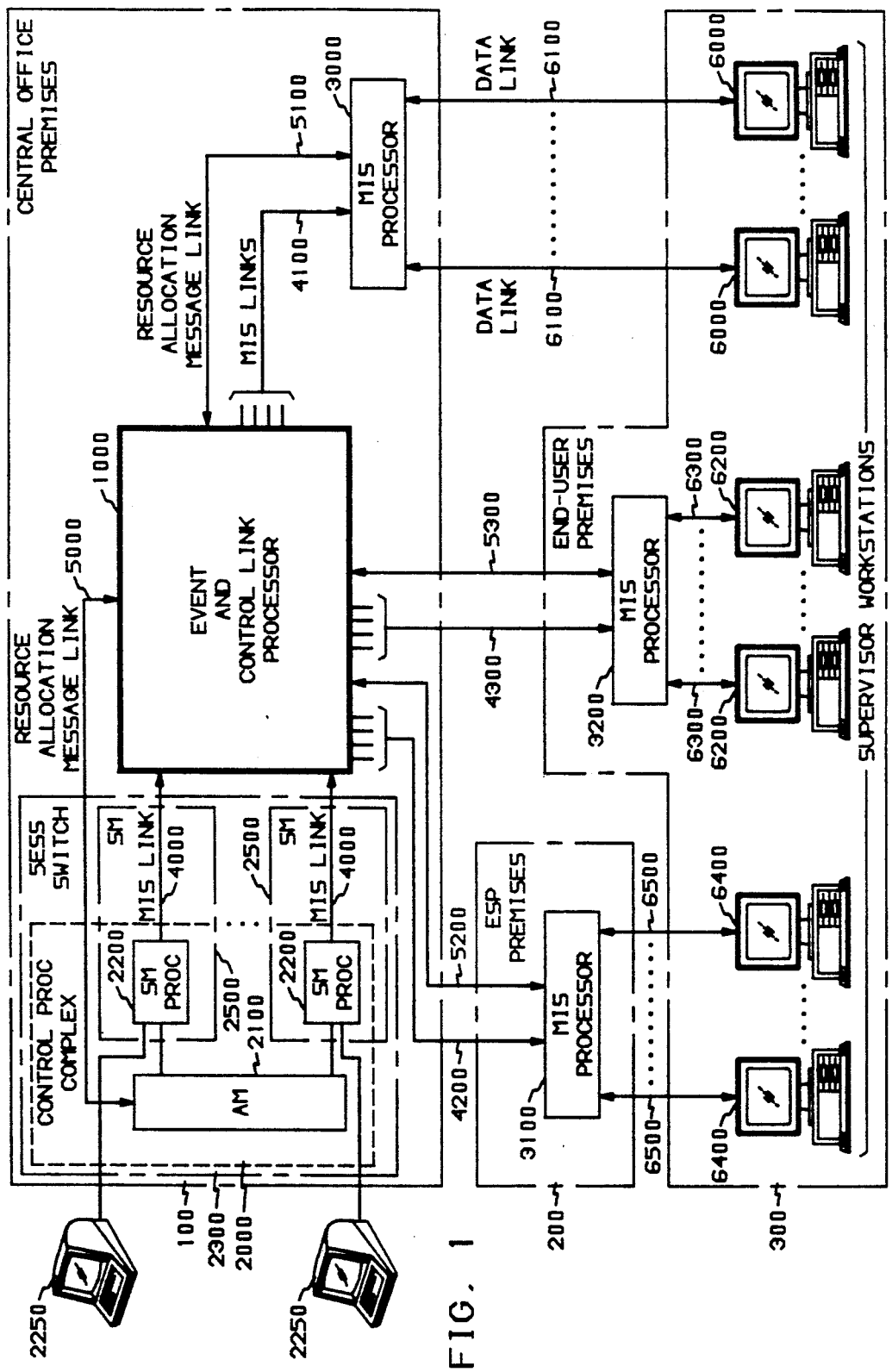
FIG. 1 is a block diagram of an arrangement illustrating a CO switching system, comprising a control processor complex, connected to an ECL (heavy line blocked), which in turn is connected to three MIS processors, each located at a different site.

In FIG. 1, an Event and Control Link Processor (ECL) 1000 is connected to three Management Information System (MIS) processors (3000, 3100, 3200) and to a 5ESS switch 2300, the latter comprising a control processor complex (CPC) 2000 (indicated by the dashed line surrounding the administrative module (AM) 2100 and switching module (SM) processors 2200) and several switching modules (SMs) 2500. The 5ESS switch is described in *AT&T Technical Journal*, vol. 64, no. 6, part 2, July-August 1985, pp. 1303-1564. In the exemplary embodiment, the ECL 1000 is an AT&T 3B2 Model 600 computer.

In FIG. 1, MIS processors 3000, 3100 and 3200 are illustratively located at the CO premises 100, at the enhanced service provider (ESP) premises 200, and at the ACD end-user premises 300. The ECL 1000 sends ACD call event data to MIS processors (3000, 3100, 3200) via MIS links (4000, 4100, 4200). The ECL 1000 and the MIS processors (3000, 3100, 3200) exchange resource allocation messages over resource allocation message links (5100, 5200, 5300).

Each MIS processor is connected to one or more supervisor work stations (6000, 6100, 6300) via data links. These supervisor work stations are used by supervisors for each ACD to monitor the ACD agent activity, to display ACD statistical information, and to request resource allocation changes via resource allocation messages.

The CPC 2000 comprises the control processor of the CO switching system, which are the AM 2100, and the SM processors 2200. The AM 2100, which allocates resources, and the SM processors 2200 are part of the 5ESS switch 2300.

Resource allocation messages are formed in MIS processors based on requests entered at supervisor work stations and are sent to the ECL 1000. The ECL 1000 screens resource allocation messages and sends those with valid requests to the AM 2100 via the resource allocation message link 5000. The AM 2100 then makes resource allocation changes based on requests received in resource allocation messages.

The SM processors 2200 of the CPC 2000 send call event data (event) messages associated with ACD calls to the ECL 1000. Event messages include "ACD agent logged in" message, time of arrival of a call and time of attachment of an agent to that call. The event messages are sent over MIS links 4000 to the ECL 1000, where the messages are partitioned and sent to the appropriate MIS processor. The SMs 2500 are connected to ACD agent instruments 2250 which actually handle calls to or from the agents.

Figure 2:
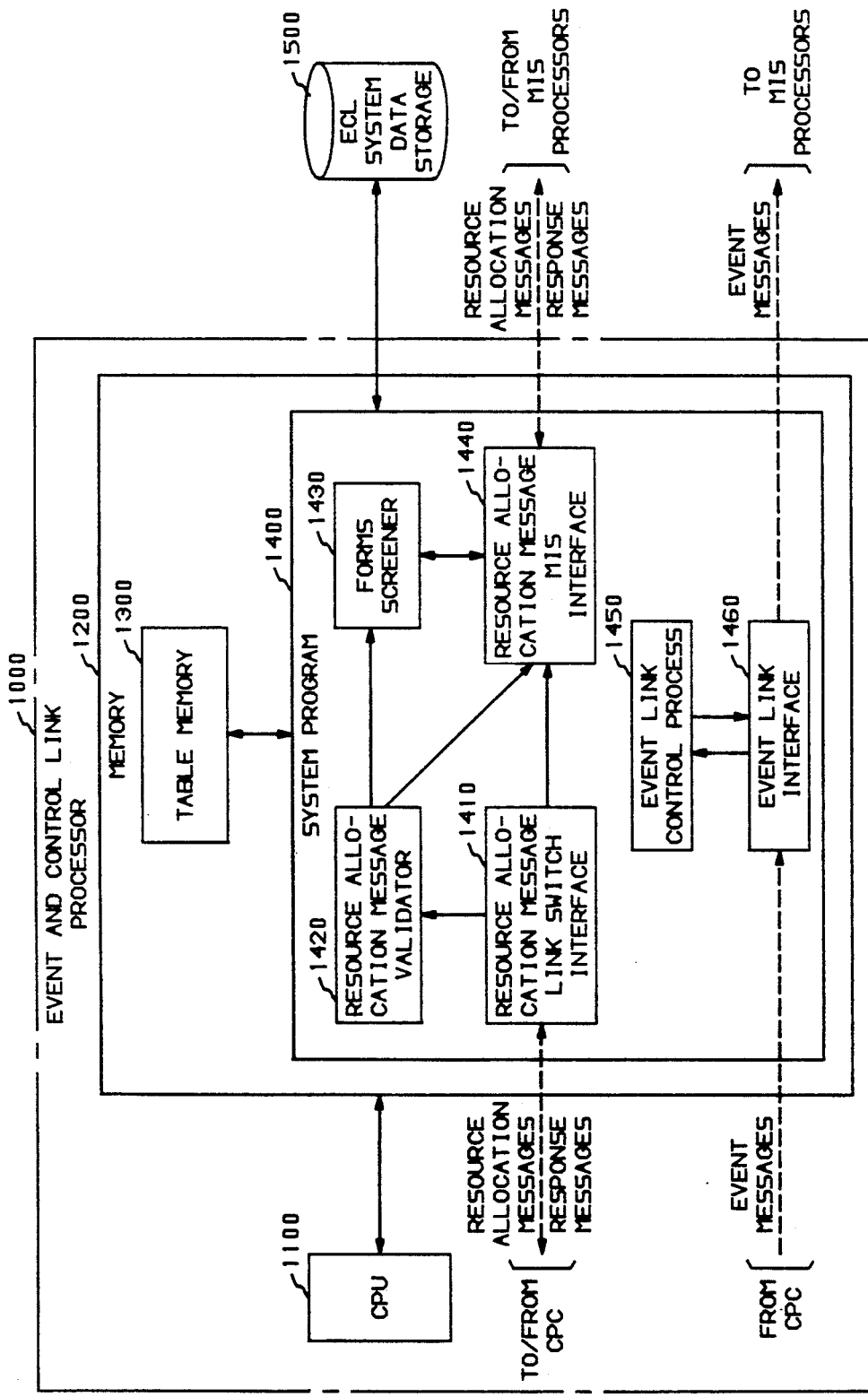
FIG. 2 shows the ECL system, illustrating the major components and processes in the system.

FIG. 2 is a diagram of an ECL system, such as the ECL 1000 in FIG. 1. The primary functions of the ECL system are to partition ACD end-user call event data and to screen resource allocation messages. The ECL uses information on both the configuration of the CO switching system and of the MIS processors to perform these functions. This information is stored in the ECL system data storage 1500. The ECL system data storage 1500 comprises an external bulk storage medium, such as a magnetic disk, which makes access to this data storage relatively slow. To minimize the delay in processing the transactions passing through the ECL system, most of the items in the database are also stored in a table memory 1300, used by various processes within the system program 1400. The table memory 1300 comprises tables, such as a table of valid ACD agents, that can be accessed quickly by all the processes needing information. Configuration information, such as the number of call queues allocated to each MIS processor, is loaded from the data storage 1500 to the table memory 1300 when the system is started. Statistical information, such as the number of messages handled in a fifteen minute period, is first collected in the table memory 1300 and then written into the data storage 1500.

The system program 1400 comprises a plurality of software processes that perform most of the functions of the ECL system. These processes communicate with each other by transmitting intraprocessor messages via the table memory 1300. Each process has an incoming message queue, with a unique queue ID, which it uses to store messages until it can read them. To transmit a message, a process, using the queue ID of the intended recipient of the message, places a pointer to the message in the incoming message queue of the intended recipient.

The Event Link Interface Module 1460, within the ECL system program 1400, performs end-user data partitioning, using information obtained from ECL System Data Storage 1500 by the Event Link Control Process 1450. Event messages are sent from the SM processors in the CPC (2200 in FIG. 1) to the ECL 1000 over MIS links (4000 in FIG. 1), where they are received by the Event Link Interface Module 1460.

Figure 3:
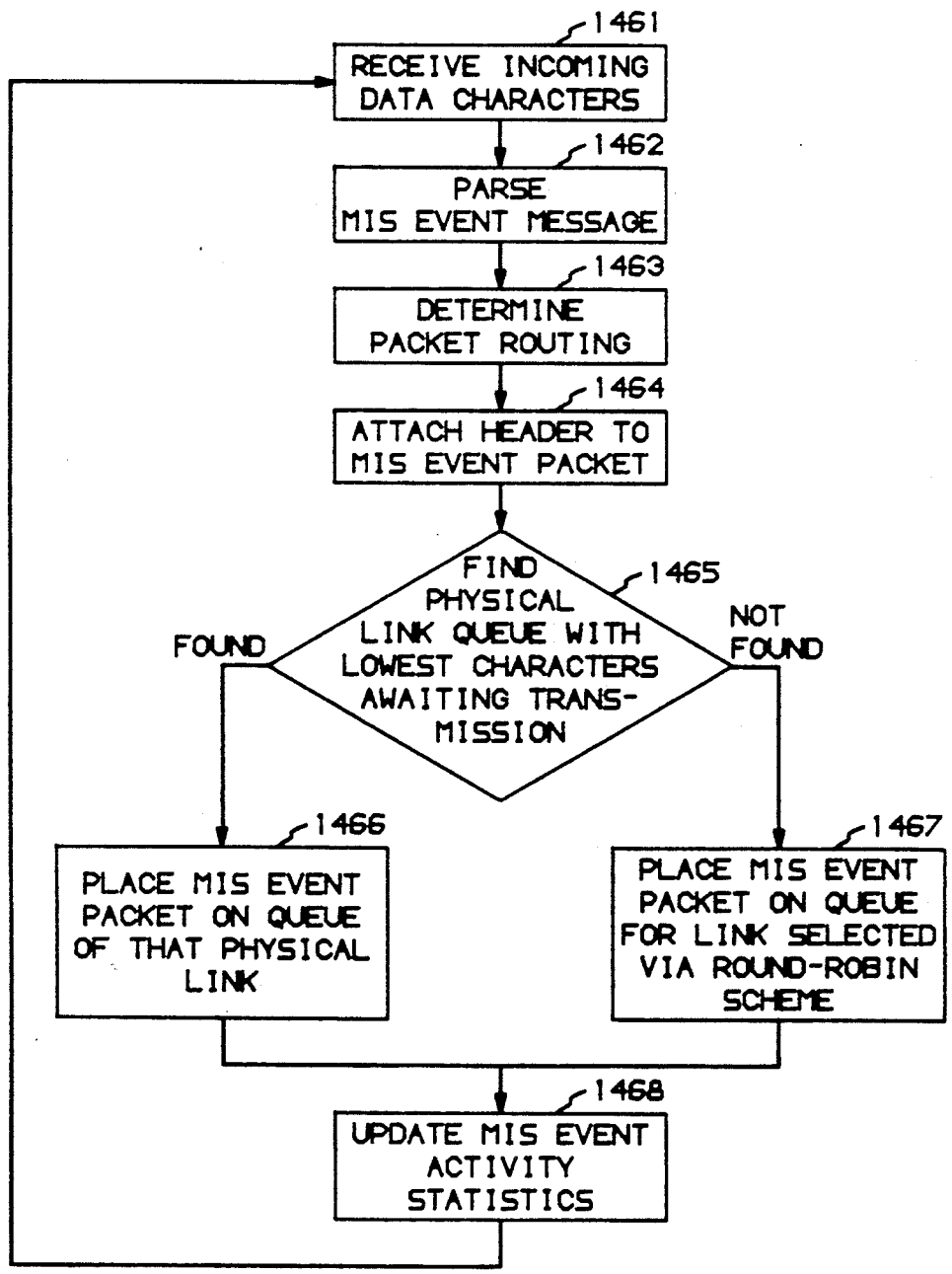

FIG. 3 is a flow diagram of the Event Link Interface Module (1460). This module is implemented in the exemplary embodiment as a line discipline module within the UNIX ® operating system. This module is activated by a hardware interrupt when data characters arrive on an MIS link (4000) from the CPC (2000) (action box 1461). The Event Link Interface Module (1460) stores the characters internally until enough are received to form a complete event message.

FIG. 4 illustrates an "Agent Logged In" event message 10000 which is sent to the ECL after an ACD agent logs into the ACD system via agent terminal equipment. The Event Link Interface Module parses the event message to extract pertinent information (action box 1462 in FIG. 3). Using the event message 10000 as an example, the module uses the type field 10100 to determine the message type, in this case, "Agent Logged In." Once the message type is determined, the module uses the position number field 10200, or alternatively, the agent ID number field 10300, as a key to search the agent ID table (11000 in FIG. 5) in the table memory (1300 in FIG. 2). Entry 11100 in the Agent ID table 11000 is the entry for the agent logged in the event message 10000. The module determines the appropriate routing of the event message 10000 (action box 1463 in FIG. 3) by using the key to find the appropriate customer field value 11103. This customer field value identifies the end-user MIS processor ID of the end-user associated with the event message 10000. The Event Link Interface Module packetizes the event message with the appropriate headers that designate the MIS processor that the message should be sent to (action box 1464), and updates the MIS event statistics in the table memory 1300 (action box 1465) by entering information regarding the transmission of the event message. The modify field 11102 of the Agent ID table 11100 in FIG. 5 is not used by the Event Link Interface Module; it represents the date that a table entry was last modified.

For purposes of providing enhanced reliability and throughput, there may be up to four physical links to each MIS processor, with each link having a message queue. The Event Link Interface Module next checks the message queues of each of the four physical links to determine the physical link having the fewest characters awaiting transmission (test 1466). If such a link is found, the event message is placed on a message queue for that link to be sent to the appropriate MIS processor (action box 1467). If all of the physical link message queues are empty, a physical link is chosen using a "round-robin" scheme, which uses each link in a fixed pattern (action box 1468).

Event Link Control Process (1450 in FIG. 2) initializes the table memory used by the Event Link Interface Module (1450), and uses a "heartbeat" handshaking protocol to monitor the status of event message links. This protocol uses "heartbeat/keep alive" messages to verify communication paths between the ECL (1000 in FIG. 1) and both SMs (2500) and MIS processors (3000, 3100, 3200). (The meaning of the terms "heartbeat" and "keep alive" will become obvious in the following description.) The protocol operates as follows using the messages illustrated in FIGS. 6 and 7: an originator of a "heartbeat/keep alive" message 14000 sets a "loop flag" 14100 to "FALSE" (zero value), and sends the message to a "receiver." The "receiver" sets the "loop flag" to "TRUE" (non-zero value) 15100 and sends the message 15000 back to the originator. If the originator fails to receive a return "heartbeat" message 15000 from the "receiver," it initiates data link recovery actions.

Figure 8:
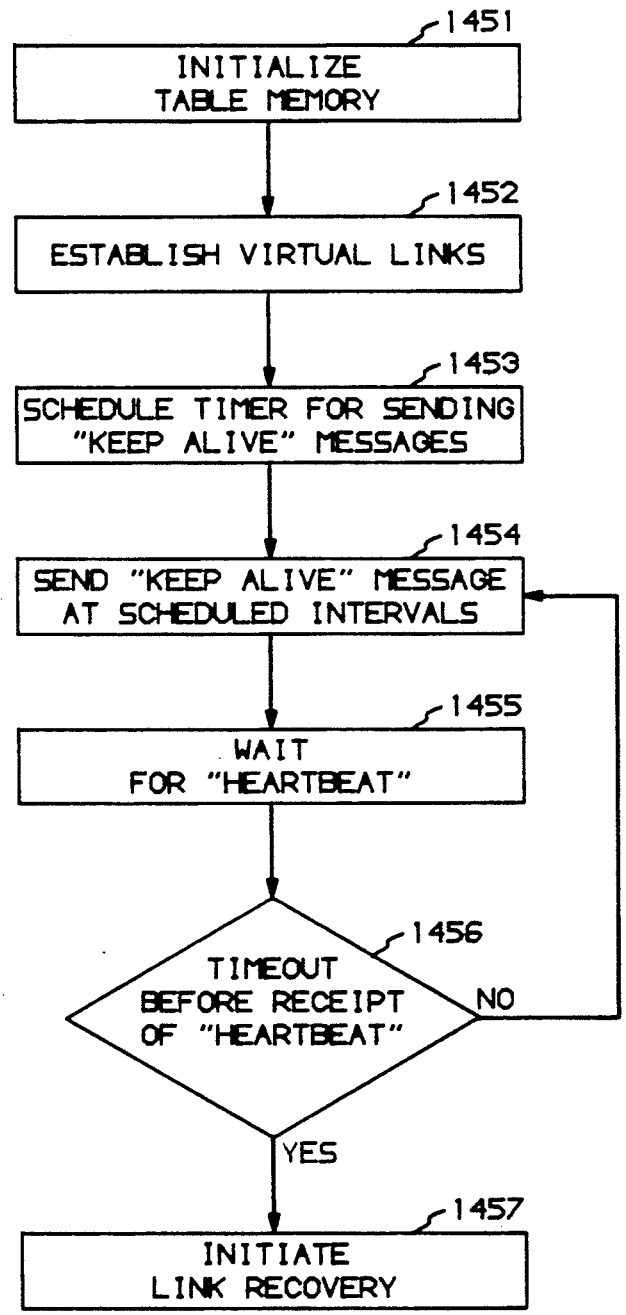

A flow diagram of an Event Link Control Process is shown in FIG. 8. The process first initializes the table memory that is to be used by the Event Link Interface Module (1460) (action box 1451). The process then establishes virtual links between the ECL and the 5ESS switch, and between the ECL and each active MIS processor (action box 1452). After the links are established, the process sets timers which trigger the transmission of "keep alive" messages if no other messages are transmitted on the links during an interval determined by the timer (action box 1453). Once the timers are set, the process follows the "heartbeat/keep alive" handshaking protocol. It sends "keep alive" messages at scheduled intervals (action box 1454) and waits to receive return "heartbeat" messages (action box 1455). If the Event Link Control Process waits too long to receive the return "heartbeat" message, or "times out" (test 1456), the process initiates a link recovery process (action box 1457). Otherwise, the Event Link Control Process continues to follow the "heartbeat/keep alive" protocol (1453).

RESOURCE ALLOCATION MESSAGE SCREENING

Resource allocation messages are sent by ACD end-users to the ACD system to make ACD system resource allocation changes. These messages are sent from MIS processors (3000 in FIG. 1) to the ECL (1000) over a resource allocation message link (5200), which sends them to the AM (2100) in the 5ESS Switch (2000) over another resource allocation message link (5000). Resource Allocation Message Link MIS Interface processes (1440 in FIG. 2) receive and send resource allocation message requests and responses over resource allocation message links from MIS processors to the ECL.

Figure 9:
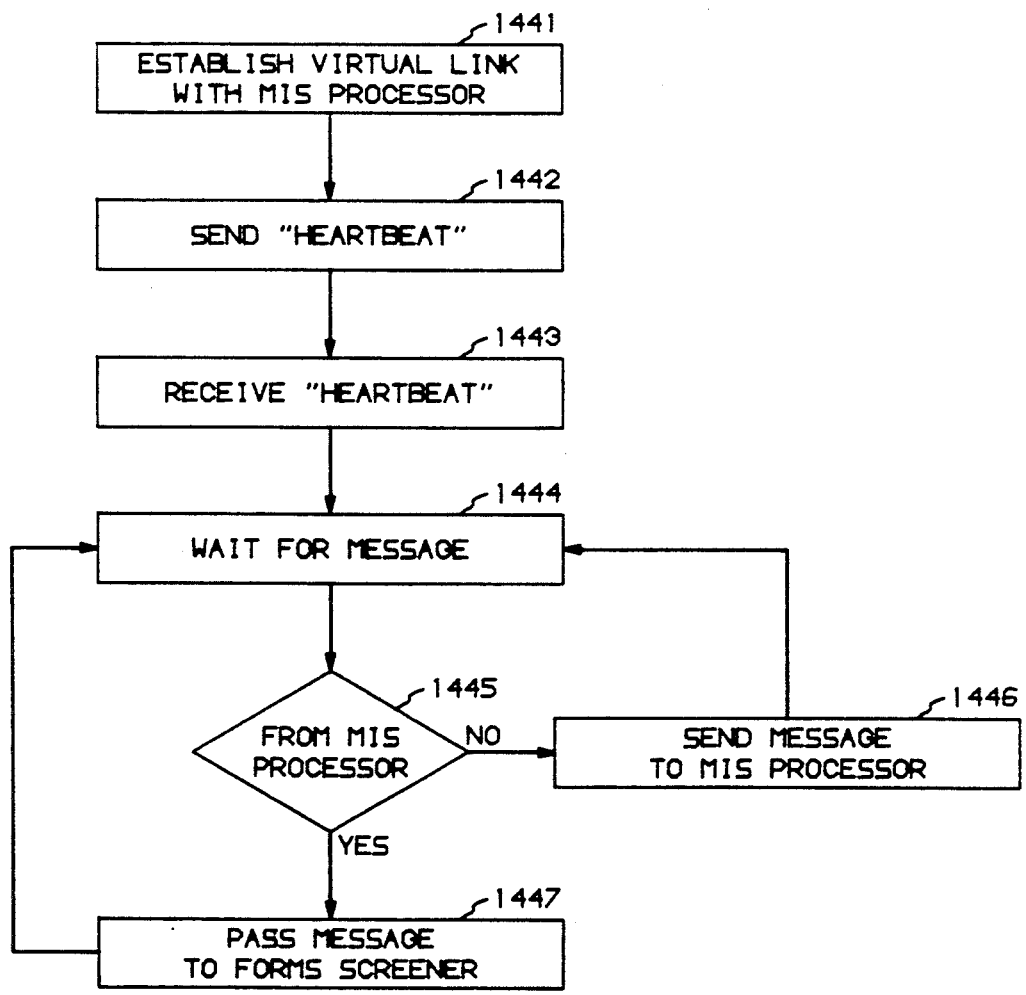

FIG. 9 is a flow diagram of a Resource Allocation Message Link Interface process. The process initially establishes a virtual link with an MIS processor (action box 1441). Next, the process initiates the ECL's "heartbeat" handshaking protocol with the MIS processor (action box 1442), waits to receive a return "heartbeat" message, and after the handshaking is complete, the process waits to receive messages (action box 1444). When a message arrives, the process determines the source of the message (test 1445). If the message is from the MIS processor, then it is a resource allocation request message, and the process passes the message to the Forms Screener process (action box 1447). Otherwise, the message is a response to a resource allocation request message, and the process sends the message to the MIS processor (action box 1446).

Figure 10:
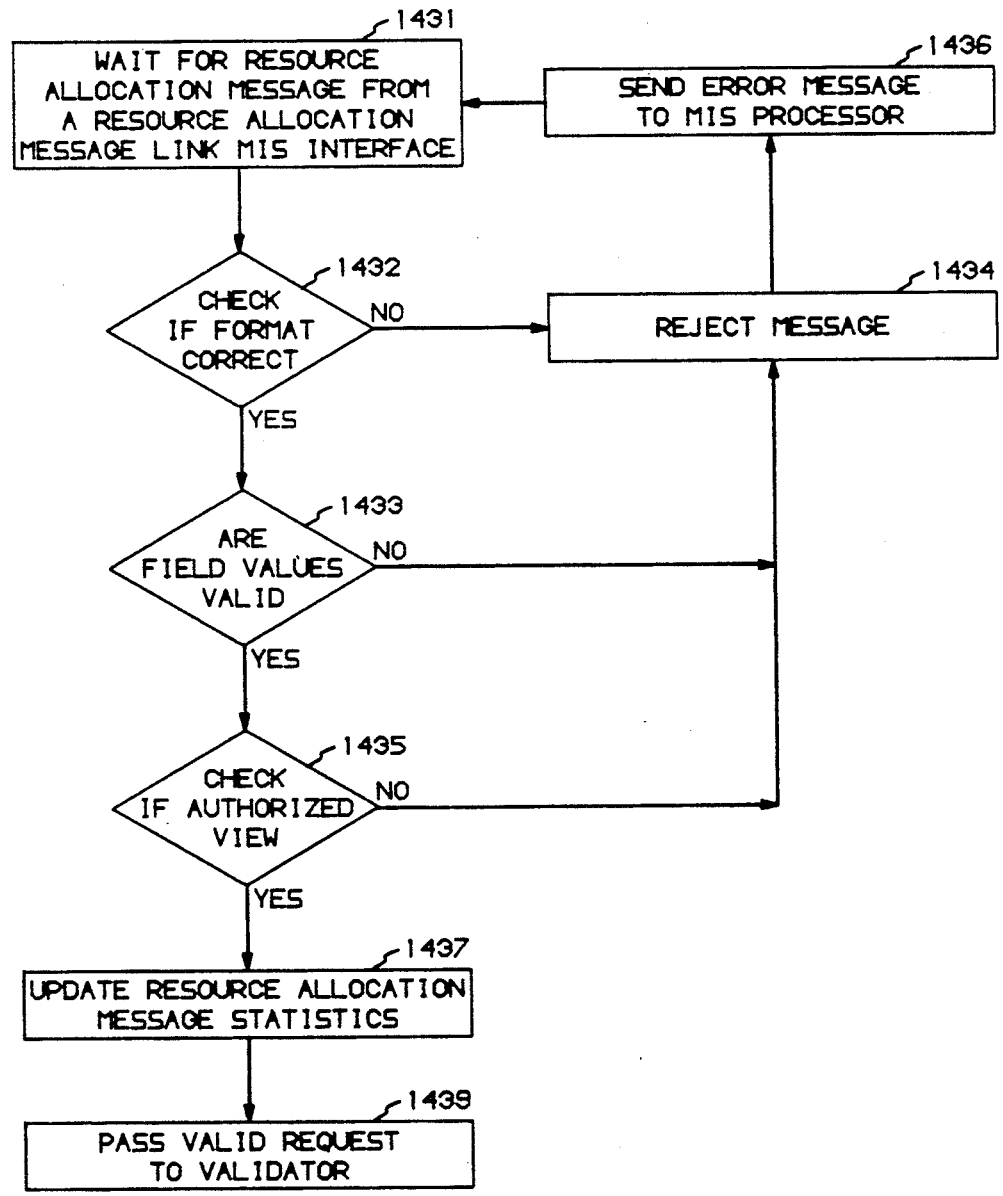

Resource allocation message screening in the ECL is performed by the Resource Allocation Message Form Screener (1430 in FIG. 2) and the Resource Allocation Message Validator (1420 in FIG. 2). FIG. 10 is a flow diagram of the Resource Allocation Message Form Screener processor. The Form Screener process waits for resource allocation messages to arrive from a Resource Allocation Message Link Interface process (action box 1431). FIG. 1 illustrates an example of a resource allocation message 16000 for changing a group of ACD agents or serving team from one call queue to another. Once a resource allocation message such as the message 16000 in FIG. 11 arrives, this process checks the format of the "arrived" message against the correct resource allocation message format (test 1432). The message 16000 in FIG. 11 shows the correct format, which comprises a header field 16100 that identifies the requesting MIS processor, followed by a view ID number field 16200 that identifies the view to be changed, a key attribute field 16300 that identifies the table attribute to use in a table memory lookup, an attribute field 16400 that identifies the attribute to be changed by the request, a command field 16500 that identifies the action requested, and a new value field 16600 that identifies the value that the attribute is to changed to.

If the arrived message is not in the correct format, the message is rejected and an error message is sent to the MIS processor that sent the "arrived" message (action boxs 1434, 1436). If the "arrived" message is in the correct format, the process parses the message by its separate fields and checks whether each of these field values are valid (test 1433). If one or more of these field values are not valid, the message is rejected.

The Form Screener process then checks whether the message references an authorized view, that is, whether it refers to a resource that can be accessed by resource allocation messages (test 1435). A view is a logical representation of a group of resources, comprising a group of data relations. In the exemplary embodiment, for example, the serving team description view comprises the serving team table (17000 in FIG. 11) and the call queue table (18000). To determine whether the resource allocation message references an authorized view, the form screener process examines the view ID number field (16200 in FIG. 11) of the resource allocation message (16000). It checks the view ID number against all valid view ID numbers in a view ID table in the table memory. If the view ID number field of the resource allocation message matches a view ID number in the view ID table, then the Form Screener process updates resource allocation message statistics in the table memory (action box 1437) and puts the "format valid" request in a buffer used by the resource allocation message validator (action box 1438). Otherwise, the message is rejected (action box 1434) and an error message is sent to the MIS processor that sent the message (action box 1436).

The final step in resource allocation message screening is the Resource Allocation Message Validator. FIG. 14 is a flow diagram of the validator process. The Validator process first retrieves a request from a buffer of requests (action box 1421). It then looks up the requesting end-user in table memory (action box 1423) to determine whether the requesting end-user has permission to make the requested changes (test 1424). Using the message 16000 in FIG. 11 as an example, the process would use the requesting MIS processor ID number (16100) and the team number (16300) to do a table lookup in the serving team table (17000 in FIG. 12) in table memory. This table lookup would determine whether the requesting end-user has permission to make allocation changes to the serving team (16300) specified in the resource allocation message (16000). The validation process would next use the requesting MIS processor ID number (16100) and the call queue number (16400) to do a similar table lookup in the call queue table (18000 in FIG. 13) to determine whether the requesting end-user has permission to make allocation changes to the call queue (16400) specified in the resource allocation message (16000). If the table memory lookup determines that the requesting end-user does have permission to make the requested changes, then the Validator process updates the resource allocation message statistics in table memory to reflect a new valid request (action box 1425) and passes the request to the resource allocation message link handler (action box 1427). If the requesting end-user does not have such permission, the request is rejected (action box 1426), and an error message is sent to the requesting end-user's MIS processor (action box 1428). In either case, the process then proceeds to get a next request, if any, form the message buffer (action box 1421).

The final function required to perform resource allocation message screening is the interfacing of the ECL resource allocation message processes with the 5ESS Switch resource allocation processes. Resource allocation messages are transmitted between the AM (2100 in FIG. 1) in the CPC (2000) and the ECL (1000) over the resource allocation message link (5000), which is a dedicated link. Resource allocation processes in the AM (2100) grant resource allocation requests and send responses to the ECL (1000).

The Resource Allocation Message Link Switch Interface process (1410 in FIG. 2) performs resource allocation interfacing functions between the ECL and the 5ESS Switch. FIG. 15 is a flow diagram of Resource Allocation Message Link Switch Interface process. The process first establishes a virtual link with an AM link interface process (action box 1411). It then goes through a continuous loop of receiving messages (action box 1413) and determining whether the messages are from the Validator process or from the AM interface process (test 1414). If a message is from the AM, the process parses the message to determine the MIS processor ID of the requestor (action box 1415), and then sends the message to the appropriate Resource Allocation Message Link Interface process (action box 1417). If the message is from the Validator process, the Resource Allocation Message Link Switch Interface process formats the message into the 5ESS resource allocation message format (action box 1416), and puts the formatted message onto a first-in-first-out (FIFO) queue to be sent the AM (action box 1418). In either case, the process then proceeds to wait for a next message to be placed on its incoming message queue (action box 1413).

It is to be understood that the above-described procedures are merely illustrative of the principles of the present invention and many variations may be devised by those skilled in the art without departing from the spirit and scope of the invention.

We claim:

1. A method of providing resource control and data processing services from a plurality of first processors for a plurality of automatic call distributor (ACD) subsystems, served from a switching system, wherein the switching system comprises a processor means, comprising the steps of:

transmitting request messages, for the allocation of resources, from the plurality of first processors to a second processor; and the second processor, comprising a memory, screening the request messages for transmission to the processor means for allocating resources;

wherein the screening of messages comprises the second processor interfacing with the first processors for receiving request messages from the first processors and for sending response messages to the first processors;

wherein the interfacing between the second processor and the first processors comprises establishing virtual links for sending request messages and response messages between the second processor and each of the plurality of first processors and periodically executing a handshaking protocol between the second processor and each first processor over the virtual links;

the second processor examining the request messages to determine whether the messages are in a predetermined format;

wherein the examining of request messages comprises the second processor determining the message type of a request message using a prespecified data field in the request message, the second processor checking the format of the request message against a predetermined format for the message type, and the second processor checking whether the request message references a resource that is allocated using request messages;

the second processor verifying that an ACD end-user, identified in the request message, is authorized to request the resource allocation of the message;

wherein the verification of authorized ACD end-users comprises searching the memory of the second processor using at least one data field within a request message as a key, and determining from the search whether the end-user identified in the message is authorized to have the request granted by the processor means;

the second processor interfacing with the processor means for sending verified request messages in the predetermined format to the processor means, and for receiving resource allocation response messages from the processor means;

wherein the interfacing between the second processor and the processor means comprises establishing a virtual link for sending the request messages and the response messages between the second processor and the processor means, and periodically executing a handshaking protocol between the second processor and the processor means over the virtual link;

whereby the periodic execution of the handshaking protocol ensures that the virtual channel is still operative;

recognizing data, associated with the plurality of ACD subsystems in the processor means;

transmitting the data from the processor means to the second processor;

partitioning the transmitted data in the second processor;

wherein the partitioning of data comprises the second processor determining a first processor that is a destination of each data message;

wherein the determining a first processor comprises determining the type of data message from a prespecified field of the message, and based on the type of message, selecting additional information in the message as a key in a search of memory in the second processor to determine the first processor to which the data message is to be transmitted;

wherein the transmitting of the data from the processor means comprises establishing a virtual link between the second processor and the processor means, periodically executing a handshaking protocol on the virtual link between the second processor and the processor means, and transmitting data messages from the processor means to the second processor over the virtual link;

and wherein the transmitting of the partitioned data comprises the second processor interfacing with the first processors for transmitting the data messages to the first processors that are the destination of each data message;

wherein the interfacing with the first processors comprises determining physical links on which to send the data messages, establishing virtual links over the physical links between the second processor and the first processors, and periodically executing a handshaking protocol on the virtual links between the second processor and each first processor; and transmitting the partitioned data to different ones of the plurality of first processors for performing data processing of said data.

2. A method of providing resource control and data processing services from a plurality of first processors for a plurality of automatic call distributor (ACD) subsystems, served from a switching system, wherein the switching system comprises a processor means, comprising the steps of:

transmitting request messages, for the allocation of resources, from the plurality of first processors to a second processor; and the second processor, comprising a memory, screening the request messages for transmission to the processor means for allocating resources;

wherein the screening of messages comprises the second processor interfacing with the first processors for receiving request messages from the first processors and for sending response messages to the first processors;

wherein the interfacing between the second processor and the first processors comprises establishing virtual links for sending request messages and response messages between the second processor and each of the plurality of first processors;

the second processor examining the request messages to determine whether the messages are in a predetermined format;

wherein the examining of request messages comprises the second processor determining the message type of a request message using a prespecified data field in the request message, the second processor checking the format of the request message against a predetermined format for the message type, and the second processor checking whether the request message references a resource that is allocated using request messages;

the second processor verifying that an ACD end-user, identified in the request message, is authorized to request the resource allocation of the message;

wherein the verification of authorized ACD end-users comprises searching the memory of the second processor using at least one data field within a request message as a key, and determining from the search whether the end-user identified in the message is identified in the memory as being authorized to have the request granted by the processor means;

the second processor interfacing with the processor means for sending verified request messages in the predetermined format to the processor means, and for receiving resource allocation response messages from the processor means;

wherein the interfacing between the second processor and the processor means comprises establishing a virtual link for sending the request messages and the response messages between the second processor and the processor means;

recognizing data, associated with the plurality of ACD subsystems in the processor means;

transmitting the data from the processor means to the second processor;

partitioning the transmitted data in the second processor;

wherein the partitioning of data comprises the second processor determining a first processor that is a destination of each data message;

wherein the determining a first processor comprises determining the type of data message from a prespecified field of the message, and based on the type of message, selecting additional information in the message as a key in a search of memory in the second processor to determine the first processor to which the data message is to be transmitted;

wherein the transmitting of the data from the processor means comprises establishing a virtual link between the second processor and the processor means, and transmitting data messages from the processor means to the second processor over the virtual link;

and wherein the transmitting of the partitioned data comprises the second processor interfacing with the first processors for transmitting the data messages to the first processors that are the destination of each data message;

wherein the interfacing with the first processors comprises determining physical links on which to send the data messages, establishing virtual links over the physical links between the second processor and the first processors; and transmitting the partitioned data to different ones of the plurality of first processors for performing data processing of said data.

* * * * *